US009224388B2

(12) United States Patent
You et al.

(10) Patent No.: US 9,224,388 B2
(45) Date of Patent: Dec. 29, 2015

(54) SOUND RECOGNITION METHOD AND SYSTEM

(75) Inventors: Kisun You, Suwon (KR); Kyu Woong Hwang, Taejon (KR); Taesu Kim, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 13/371,966

(22) Filed: Feb. 13, 2012

(65) Prior Publication Data

US 2012/0226497 A1   Sep. 6, 2012

Related U.S. Application Data

(60) Provisional application No. 61/449,493, filed on Mar. 4, 2011.

(51) Int. Cl.
*G10L 15/00*     (2013.01)
*G10L 15/08*     (2006.01)

(52) U.S. Cl.
CPC ..................................... *G10L 15/08* (2013.01)

(58) Field of Classification Search
CPC ......... G10L 15/10; G10L 15/00; G10L 15/22; G10L 15/30; G10L 15/20; G10L 15/07; G10L 15/063; G10L 21/0208; G10L 15/265; G10L 17/005; G10L 15/08; G10L 15/144; G10L 13/06; G10L 15/142; G10L 13/08; H05K 999/99
USPC ......... 704/231, 233, 243, 226, 235, 246, 255, 704/250, 256, 256.1, 256.2, 256.3, 256.5, 704/266, E15.027, E15.029, E17.006, 704/E17.007, 239, 238
See application file for complete search history.

(56) References Cited

U.S. PATENT DOCUMENTS

| | | | |
|---|---|---|---|
| 6,266,644 | B1 | 7/2001 | Levine |
| 6,519,563 | B1 | 2/2003 | Lee et al. |
| 7,680,654 | B2 | 3/2010 | Goronzy et al. |
| 7,873,521 | B2 * | 1/2011 | Kurozumi et al. ............ 704/270 |
| 8,150,044 | B2 * | 4/2012 | Goldstein et al. ............... 381/57 |
| 2004/0015358 | A1 * | 1/2004 | Reynolds ...................... 704/256 |
| 2004/0107099 | A1 * | 6/2004 | Charlet ......................... 704/234 |
| 2005/0091040 | A1 | 4/2005 | Nam et al. |
| 2006/0053014 | A1 * | 3/2006 | Yoshizawa ................. 704/256.4 |
| 2007/0198257 | A1 * | 8/2007 | Zhang et al. .................. 704/233 |
| 2009/0228272 | A1 | 9/2009 | Herbig et al. |
| 2011/0046949 | A1 * | 2/2011 | Satt et al. ...................... 704/231 |

(Continued)

OTHER PUBLICATIONS

Lee, Hyeopwoo, et al., "A Voice Trigger System Using Keyword and Speaker Recognition for Mobile Devices", IEEE Transactions on Consumer Electronics, vol. 55, No. 4, Nov. 1, 2009, pp. 2377-2384.

(Continued)

*Primary Examiner* — Jakieda Jackson
(74) *Attorney, Agent, or Firm* — Toler Law Group, PC

(57) ABSTRACT

A method for generating an anti-model of a sound class is disclosed. A plurality of candidate sound data is provided for generating the anti-model. A plurality of similarity values between the plurality of candidate sound data and a reference sound model of a sound class is determined. An anti-model of the sound class is generated based on at least one candidate sound data having the similarity value within a similarity threshold range.

19 Claims, 13 Drawing Sheets

(56) References Cited

U.S. PATENT DOCUMENTS

2011/0191099 A1* 8/2011 Farmaner et al. ............. 704/9
2012/0136658 A1* 5/2012 Shrum et al. ............. 704/231

OTHER PUBLICATIONS

Lleida, E., et al., "Out-of-Vocabulary Word Modelling and Rejecting for Keyword Spotting", Eurospeech '93, Sep. 22, 1993, pp. 1265-1268.

Bartkova K., et al., "Error Analysis on Field Data and Improved Garbage HMM Modelling", 4th European Conference on Speech Communication and Technology, Eurospeech '95, Madrid, Spain, Sep. 18, 1995, vol. 2, pp. 1275-1278.

Partial International Search Report for International Application No. PCT/US2012/025553, mailed Apr. 19, 2012.

Hong Lu et al., "SoundSense: Scalable Sound Sensing for People-Centric Applications on Mobile Phones", MobiSys'09, Jun. 22-25, 2009, Krakow, Poland, pp. 165-178.

Written Opinion of the International Preliminary Examining Authority for PCT/US2012/025553 mailed Jul. 5, 2013, 9 pages.

International Search Report and Written Opinion—PCT/US2012/025553—ISA/EPO—dated Jun. 6, 2012.

Koo M. W., et al., "An Utterance Verification System Based on Subword Modeling for a Vocabulary Independent Speech Recognition System", Eurospeech '99, vol. 1, Sep. 5, 1999, pp. 287-290.

Rose R. C., et al., "A Training Procedure for Verifying String Hypotheses in Continuous Speech Recognition", 1995 International Conference on Acoustics, Speech and Signal Processing, vol. 1, May 9, 1995, pp. 281-284.

International Preliminary Report on Patentability for PCT/US2012/025553 mailed Sep. 30, 2013, 27 pp.

* cited by examiner

SOUND RECOGNITION METHOD AND SYSTEM

CROSS-REFERENCE TO RELATED APPLICATIONS

This application is based upon and claims the benefit of priority from U.S. Provisional Patent Application No. 61/449,493, filed on Mar. 4, 2011, the entire contents of which are incorporated herein by reference.

TECHNICAL FIELD

The present disclosure relates generally to sound recognition technology. More specifically, the present disclosure relates to a sound recognition method and system for providing a sound recognition service to one or more sound recognition applications based on sound models and anti-models provided by one or more sound data providers and shared between the sound recognition applications.

BACKGROUND

In a sound recognition system, an acoustic model or sound model is often used as a statistical representation of sound that makes up each recognition target word or target sound class. For example, the target sound class includes a speech sound class such as a voice command/instruction as well as a non-speech sound class such as characteristic ambient sound of a certain place. In addition, to improve the recognition accuracy, an anti-model, which is a statistical representation of non-target sound classes, i.e., various sound classes other than the target sound class, may be used. In this type of sound recognition system, an input sound to be detected is compared with a sound model of a target sound class to determine a likelihood L(TS) that the input sound corresponds to the target sound class TS. The input sound is further compared with an anti-model associated with the target sound class to determine another likelihood L(~TS) that the input sound corresponds to non-target sound classes ~TS. Based on both likelihoods, a final determination is made on whether the input sound belongs to the target sound class. For example, the input sound is highly likely to correspond to the target sound class TS as the likelihood L(TS) becomes greater whereas the likelihood L(~TS) becomes smaller.

A sound model of a target sound class may be generated based on training sound samples belonging to the target sound class. For example, a sound model of a speech sound class is generated based on various speech sound samples. Further, an anti-model of the speech sound class may be generated based on sound samples of various non-target sound classes that are distinguishable from the target sound class. For example, the anti-model of the speech sound class is generated based on sound samples of various non-speech sound classes. As a greater number of sound samples are used, more accurate sound models and anti-models may be generated.

Conventionally, sound models and anti-models for use in a sound recognition system are prepared and updated by a developer of sound recognition software or applications running on the system. For example, a developer of a sound recognition application for installation on a mobile device also prepares sound models and anti-models dedicated for such application. Preparation and update of the sound models and anti-models are performed based on sound samples collected by the developer. Since the developer is generally more interested in target sound classes for the sound recognition application, the scope of which may be clearly defined, it is relatively easy to collect sound samples for preparation of sound models of the target sound classes. Unfortunately, it is difficult for the developer to collect sound samples of various non-target sound classes for preparing and updating anti-models, the scope of which may be broader and rather indefinite compared to the target sound classes. Thus, it is challenging for the developer to generate accurate anti-models by collecting various non-target sound samples.

More than one sound recognition application is often installed in a device to access various sound models and anti-models for detection of respective target sound classes from an input sound. In this operation setting, each application individually operates to detect its target sound classes by accessing a subset of the sound models and anti-models. However, if a plurality of applications is running on the device simultaneously, this may increase the computational load and require more data storage, and thus deteriorate the performance of the device.

SUMMARY

The present disclosure provides sound recognition systems and methods for providing a sound recognition service to one or more sound recognition applications based on sound models and anti-models provided by one or more sound data providers and shared between the sound recognition applications.

According to one aspect of the present disclosure, a method for generating an anti-model of a sound class is disclosed. The method includes receiving a plurality of candidate sound data and receiving a reference sound model of the sound class. Further, a plurality of similarity values between the plurality of candidate sound data and the reference sound model is determined. The anti-model of the sound class is generated based on at least one candidate sound data having the similarity value within a similarity threshold range. This disclosure also describes a system relating to this method.

According to another aspect of the present disclosure, a method for providing a sound recognition service to at least one application in a device is disclosed. The method includes receiving an input sound, determining a first likelihood of the input sound matching a target sound class of the at least one application based on a sound model of the target sound class; and determining a second likelihood of the input sound matching at least one non-target sound class based on an anti-model of the target sound class. A sound detection result indicating whether the input sound corresponds to the target sound class is generated based on the first likelihood and the second likelihood. This disclosure also describes a device relating to this method.

According to yet another aspect of the present disclosure, a system for providing at least one of a sound model and an anti-model to be used in sound recognition is disclosed. The system includes a receiving unit and an anti-model generation unit. The receiving unit is configured to receive a plurality of candidate sound data. The anti-model generation unit is configured to receive a reference sound model of a sound class, and determine a plurality of similarity values between the plurality of candidate sound data and the reference sound model. The anti-model of the sound class is generated based on at least one candidate sound data having the similarity value within a similarity threshold range.

According to yet another aspect of the present disclosure, a device for providing a sound recognition service to at least one application running on the device is disclosed. The device includes a sound sensing unit configured to capture an input sound, a storage unit configured to store a sound model and an anti-model of a target sound class, and a sound detection unit. The sound detection unit is configured to determine a first likelihood of the input sound matching the target sound class based on the sound model of the target sound class, and determine a second likelihood of the input sound matching at least one of the non-target sound classes based on the anti-model of the target sound class. The sound detection unit is adapted to generate a sound detection result indicating whether the input sound corresponds to the target sound class, based on the first likelihood and the second likelihood.

DETAILED DESCRIPTION

Figure 1:
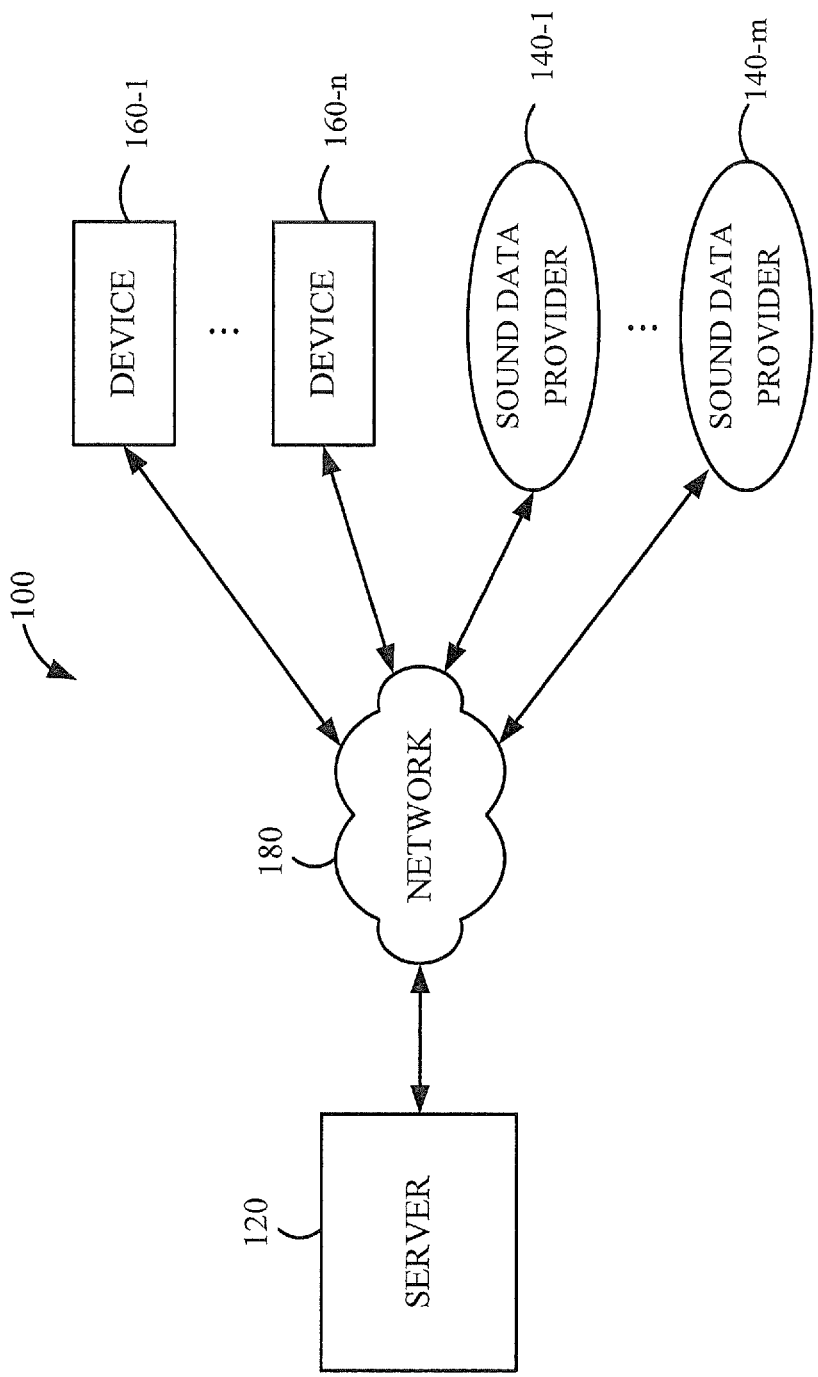
FIG. 1 illustrates a sound recognition system in accordance with one embodiment of the present disclosure.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

FIG. 1 illustrates a sound recognition system 100 in accordance with one embodiment of the present disclosure. The sound recognition system 100 includes a server 120 configured to communicate with one or more sound data providers 140-1, . . . , 140-m via a network 180. The server 120 is configured to receive sound data from any of the sound data providers 140-1, . . . , 140-m. The sound data providers 140-1, . . . , 140-m may include, but not be limited to, an application developer or a computer system operated by the developer.

Figure 2:
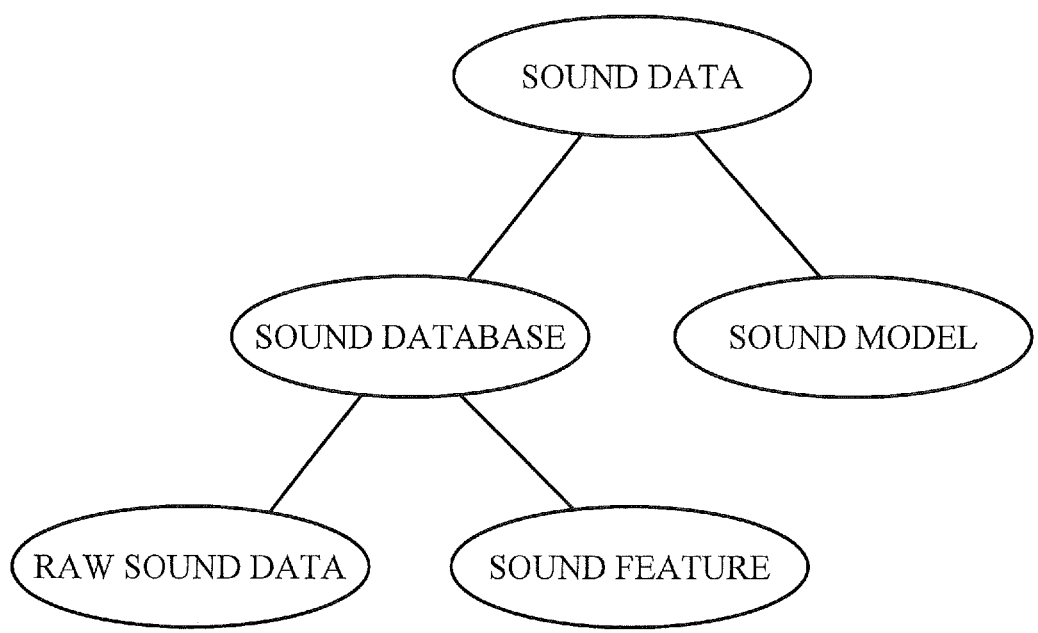
FIG. 2 is a diagram of a data hierarchy of sound data.

As used herein, the term "sound data" refers to various representations of sound including a sound database and/or a sound model. As shown in FIG. 2, the sound data includes a sound database. Specifically, the sound database includes raw sound data (e.g., waveform signals) and/or sound features extracted from raw sound data. The sound features may be any type of sound features including, but not limited to, MFCC (Mel-frequency Cepstral Coefficient), LPCC (Linear Predictive Cepstral Coefficient), PLP (Perceptual Linear Predictive) and spectral entropy, and a combination thereof. In addition, the sound data includes a sound model, which is statistically indicative of characteristics of sound databases belonging to a particular sound class.

The sound data are classified into one or more sound classes, which may be used as identifiers or labels of target sounds in sound recognition. For example, sound data indicative of a voice and a baby cry sound may be classified into a speech sound class and a baby cry sound class, respectively. Further, environmental sound data indicative of ambient sound of a restaurant may be classified into a restaurant sound class. The sound data may be provided with one or more sound tags identifying a sound class of the sound data. Different sound data providers may use different sound tags to identify sound data belonging to the same sound class. For example, different sound tags such as "speech," "voice" and "talk" may be used to identify sound data belonging to a human speaking sound class.

Referring back to FIG. 1, the sound data received from any of the sound data providers 140-1, . . . , 140-m may include a sound data provider identification (ID) indicating an originating sound data provider which transmits the sound data to the server 120. The sound data may additionally include an accessibility indication on whether the sound data is accessible by a sound data provider other than the originating sound data provider which provided the sound data. If the accessibility indication indicates that the sound data is not accessible by sound data providers other than the originating sound data provider, the corresponding sound data cannot be used for generating a sound model and/or an anti-model for sound recognition applications developed by other sound data providers.

The server 120 is configured to generate a sound model and/or an anti-model based on the sound data provided from the sound data providers 140-1, . . . , 140-m. The server 120 may also transmit the generated sound model and/or the anti-model to any of the sound data providers 140-1, . . . , 140-m. In some embodiments, if the sound model and/or the anti-model is generated based on the sound data including an accessibility indication that the sound data is not accessible by a sound data provider other than the originating sound data provider, the generated sound model and/or anti-model may be transmitted only to the originating sound data provider which uploaded the sound data.

Although not illustrated in FIG. 1, the server 120 may provide a memory for storing sound models (not shown). The memory is configured to manage sound data of various sound classes, sound models and/or anti-models generated based on the sound data, so that they can be shared among various sound data providers and applications. In one embodiment, the memory may allow a sound data provider to access the sound models and/or anti-models when the sound data provider pays for the use of the sound models and/or anti-models through an e-billing system. Using the memory, the sound data provider can develop a sound recognition application based on any purchased sound models and/or anti-model, which eliminates the need for the sound data provider to collect sound data and generate sound models and anti-models by themselves. Further, for the purpose of generating anti-models, some sound data providers may obtain sound data uploaded by other sound data providers or sound models generated based on those sound data. Thus, sound data providers which do not have a sufficient pool of sound data can generate more accurate anti-models based on the sound models and sound data purchased from the memory.

The server 120 is further configured to communicate with devices 160-1, . . . , **160-*n* via the network 180. Each of the devices 160-1, . . . , 160-*n* may be a mobile device or any other type of electronic device operational in any type of network, as well as any combination of networks, including cellular networks, circuit switching networks, public switching networks, local area networks, wide area networks, wireless networks, and/or packet switching networks. The server 120 may receive a request for a sound model and/or an anti-model from any one of the devices 160-1, . . . , 160-*n*. In response to such request, the server 120** provides the requested sound model and/or anti-model to the requesting device.

On each of the devices 160-1, . . . , **160-*n*, one or more sound recognition applications may run, which is operated to receive an input sound and detect a target sound class from the input sound. Each of the devices 160-1, . . . , 160-*n* may capture an input sound from the surroundings using its sound sensing unit such as a microphone. Each device may perform sound recognition on the input sound to provide a sound detection result to the sound recognition applications being executed thereon. In some embodiments, the devices 160-1, . . . , 160-*n* use sound models and anti-models for sound recognition. Each of the devices 160-1, . . . , 160-*n* is configured to determine whether the input sound corresponds to one or more target sound classes of the sound recognition applications based on sound models of the target sound classes. Specifically, to detect a particular target sound class of an application running on each device, the device may use a sound model of the target sound class to determine a likelihood that the input sound corresponds to the target sound class. Further, each of the devices 160-1, . . . , 160-*n* is configured to determine whether the input sound corresponds to the one or more target sound classes based on one or more anti-models of the one or more target sound classes. The anti-models may be used to determine a likelihood that the input sound corresponds to one or more non-target sound classes other than the target sound classes. Thus, to detect a target sound class from the input sound, the devices 160-1, . . . , 160-*n*** may use the sound model of the target sound class as well as the corresponding anti-model. For example, when a speech sound recognition application is executed on a device, the device uses a sound model of a speech sound class as well as an anti-model of the speech sound class, which is indicative of other sound classes but "similar" to the speech sound class. In the present description, a sound class "similar" to a specific sound class refers to a sound class that is not identical to but not far distinct from the specific sound class in terms of acoustic characteristics indicated by the sound classes.

In some embodiments, more than one sound recognition application having different target sound classes may be executed on any one of the devices 160-1, . . . , **160-*n* (e.g., device 160-1) simultaneously. Each of the sound recognition applications may have a different set of target sound classes to detect. For example, some of the sound recognition applications need to detect target sound classes including a sound class of instructions or commands for performing some functions of the device 160-1 or the applications. On the other hand, some other sound recognition applications are required to detect environmental sound classes indicative of events occurring in the surroundings of the device 160-1. In this case, the device 160-1 or a recognition engine installed therein may detect the target sound classes from the input sound, and then provide the sound detection results to the sound recognition applications as required. The sound recognition applications may utilize the received sound detection results to trigger respective functions. For example, a baby cry recognition application for recognizing an emergency situation surrounding a baby is running on the device 160-1 as a background application while a speech sound recognition application for recognizing voice commands for operating a music player is separately initiated. In this example, the device 160-1 determines whether the input sound corresponds to any one of the target sound classes of the applications including a baby cry sound class and a speech sound class. When it is detected that the input sound corresponds to the baby cry sound class, the device 160-1 provides the sound detection result to the baby cry recognition application. In the meantime, the device 160-1 may provide the speech sound recognition application with a message that a speech sound class is not detected from the input sound. Details on the sound recognition operation by each of the devices 160-1, . . . , 160-*n*** will be described below.

Figure 3:
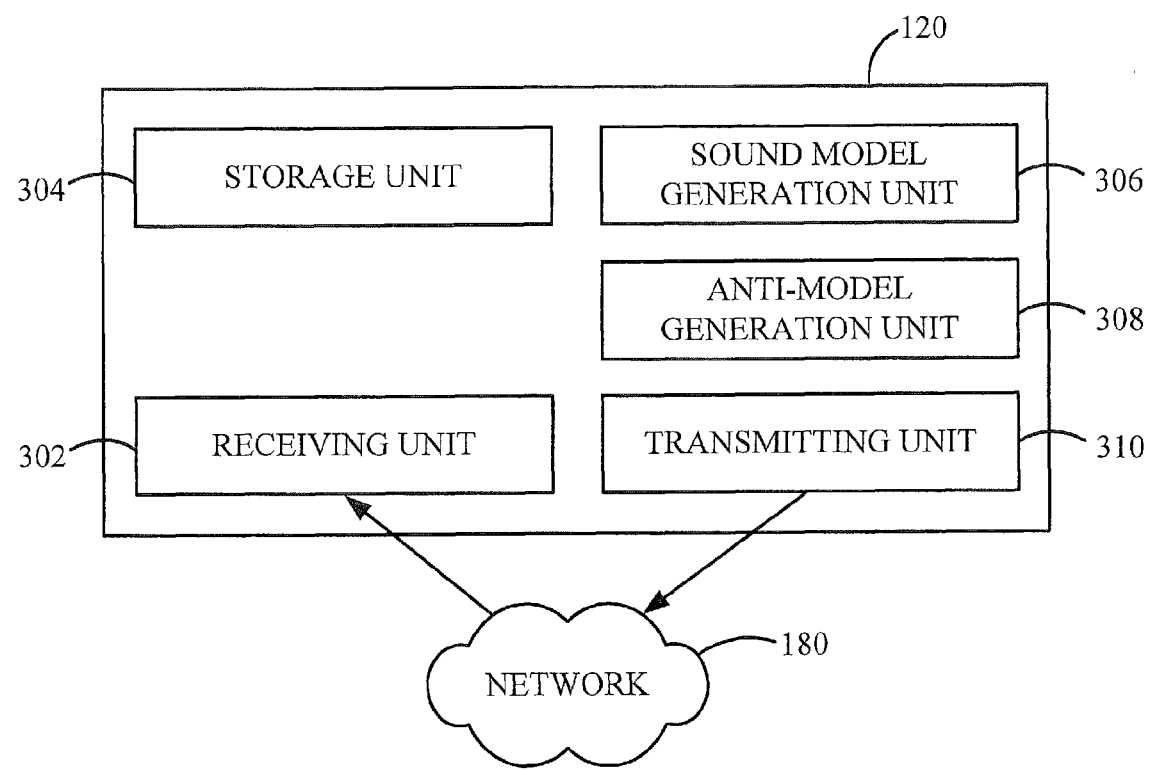
FIG. 3 shows a configuration of a server included in the sound recognition system described in FIG. 1 in accordance with one embodiment of the present disclosure.

FIG. 3 illustrates a configuration of the server 120 according to one embodiment of the present disclosure. The server 120 includes a receiving unit 302 configured to receive sound data from any of the sound data providers 140-1, . . . , **140-*m* through the network 180. As described above, the sound data may include one or more sound databases and/or one or more sound models. Along with the sound data, an associated sound tag may be received through the receiving unit 302. Further, the receiving unit 302 may receive, from any of the sound data providers 140-1, . . . , 140-*m*, other information on the sound data, such as a sound data provider ID of an originating sound data provider uploading the sound data and an accessibility indication associated with the sound data. In some embodiments, the receiving unit 302 may also receive a request for a sound model and/or an anti-model from any one of the devices 160-1, . . . , 160-*n* via the network 180**.

The server 120 further includes a storage unit 304 configured to store sound data. The storage unit 304 may store a sound tag table in which sound tags associated with the sound data are arranged into hierarchical groups. Different sound data providers may use different sound tags to identify sound data of the same sound class. Specifically, a lower level group in the hierarchical groups may include different sound tags for identifying sound data of the same sound class, while a higher level group may include a single sound tag for identifying the same sound data. For example, sound tags that indicate a human speaking sound class but are named differently such as "speech," "voice" and "talk" may be grouped into one of the lower level groups. In some embodiments, the sound tags for identifying sound data of the same sound class may be grouped into more than two hierarchical levels. Thus, a higher level group is indicative of a broader category of sound tags and includes more than one lower level group. By way of example, the sound tag table may include a higher level group of sound tags indicating a human generated sound class; and lower level groups of specific human generated sound classes, such as "laughing," "breathing," and "scream." In some embodiments, the storage unit 304 may further store accessibility indications associated with the sound data.

The server 120 further includes a sound model generation unit 306 configured to generate a sound model based on sound databases, which may be uploaded from sound data providers 140-1, . . . , **140-*m* or pre-stored in the storage unit 304. In some embodiments, the sound model generation unit 306 may generate a sound model based on the sound databases by using any well-known techniques including, but not limited to, GMM (Gaussian Mixture Model) or HMM (Hidden Markov Model). As more sound databases are used in generating a sound model, the accuracy and reliability of the sound model is improved. For example, a speech sound model that is more accurately indicative of a speech characteristic can be generated by modeling a larger number of sound databases of a speech sound class. The generated sound models may be stored in the storage unit 304 so that the sound models are transmittable to any of the sound data providers 140-1, . . . , 140-***m* and/or the devices 160-1, . . . , 160-*n* for further processing.

The server 120 further includes an anti-model generation unit 308 configured to generate an anti-model. An anti-model of a particular sound class is a statistical representation of one or more sound classes other than but similar to the particular sound class. For example, with respect to a speech sound class, a laughing sound class or crying sound class may be a similar sound class which is indicated by the anti-model of the speech sound class, whereas a crashing or footstep sound class may be far distinct sound classes which may not be indicated by the anti-model of the speech sound class.

Figure 4:
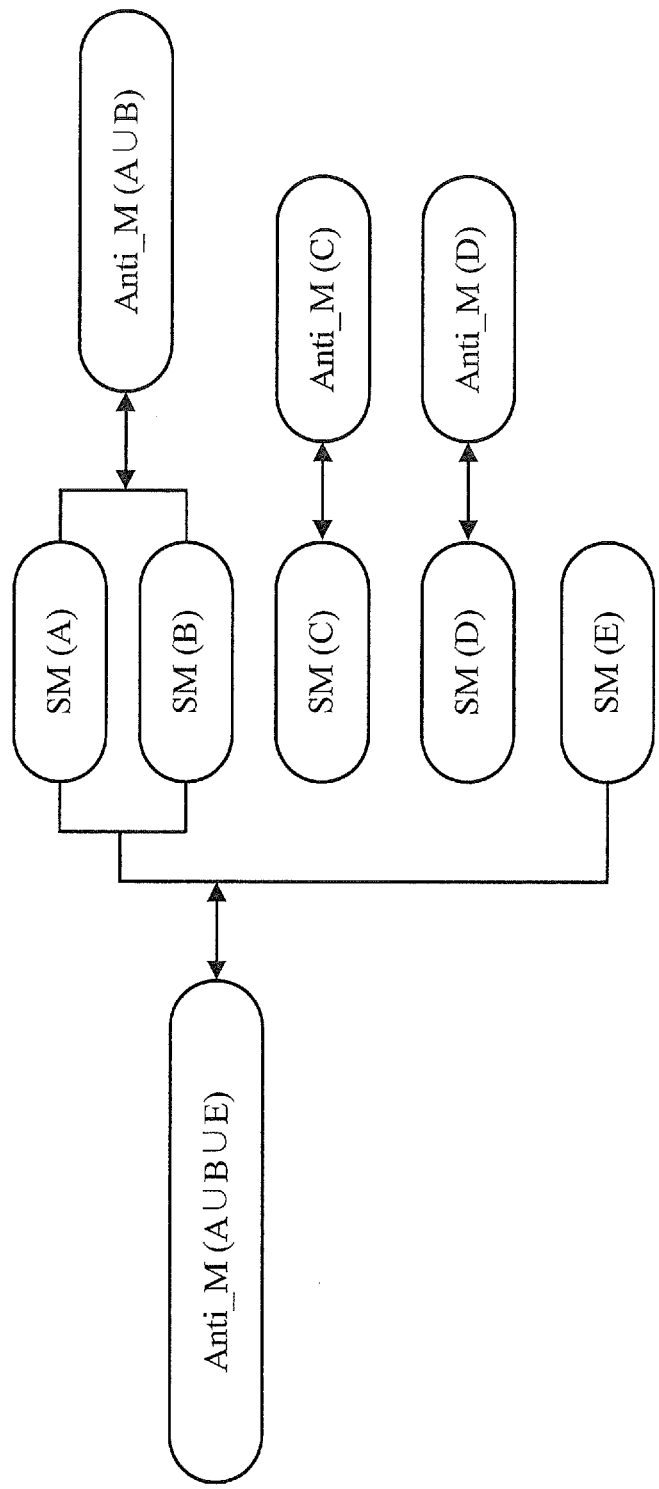
FIG. 4 depicts a diagram of exemplary sound models and anti-models generated by the server.

In one embodiment, the anti-model generation unit 308 is configured to generate an anti-model of one sound class. For example, as illustrated in FIG. 4, the anti-model generation unit 308 generates an anti-model Anti_M(C) of a sound class C and Anti_M(D) of a sound class D. As described above, the generated anti-models Anti_M(C) and Anti_M(D) may be indicative of sound classes which are distinct from the sound classes C and D but are "similar" to the sound classes C and D, respectively. As the anti-model may be generated based on a more number of sound data, the accuracy of the anti-model may be improved. In other words, as a greater number of similar sound classes are indicated by the anti-model, the accuracy of the anti-model is further enhanced. In some embodiments, the anti-model generation unit 308 uses sound databases, which may be uploaded from any of the sound data providers 140-1, . . . , 140-*m*, to generate an anti-model. Further, the anti-model generation unit 308 may use sound models of various sound classes, which may be received from any of the sound data providers 140-1, . . . , 140-*m* or generated by the sound model generation unit 306, to generate an anti-model.

Additionally, the anti-model generation unit 308 is configured to generate an anti-model of a combination of two or more sound classes. In some embodiments, the anti-model generation unit 308 generates an anti-model of two or more sound classes which are frequently targeted by a single sound recognition application. For example, referring to FIG. 4, if both sound classes A and B are targeted by a single application, the anti-model generation unit 308 may generate an anti-model Anti_M(A∪B) indicative of sound classes other than but similar to the sound classes A and B. Further, the anti-model generation unit 308 may generate an anti-model of two or more sound classes, some of which are targeted by one application while the other sound classes are targeted by another application. In this case, the generated anti-model may be shared by the two applications to detect the respective target sound classes. For example, referring to FIG. 4, if the sound classes A and B are targeted by one application, and the sound class E is targeted by another application, the anti-model generation unit 308 may generate an anti-model Anti_M(A∪B∪E) to be shared by the two applications.

Sound models and/or anti-models generated in the manner as described above may be stored on the storage unit 304. The stored sound models and/or anti-models may be provided in response to a request from any of the sound data providers 140-1, . . . , 140-*m* and/or the devices 160-1, . . . , 160-*n*. In the example of FIG. 4, if the anti-model Anti_M(A∪B∪E) is generated and stored on the storage unit 304, the anti-model Anti_M(A∪B∪E) can be provided to a device in which one or more applications targeting at least one of the sound classes A, B and E are executed.

Further, the sound models and/or the anti-models stored on the storage unit 304 are updatable by the sound model generation unit 306 and the anti-model generation unit 308, based on new sound data uploaded from any of the sound data providers 140-1, . . . , 140-*m*. For example, when new sound databases of a speech sound class are uploaded to the server 120, the sound model generation unit 306 may update a sound model of the speech sound class based on the new sound databases. Further, the anti-model generation unit 308 may update anti-models of sound classes, which are similar to the speech sound class, based on the new sound databases. The storage unit 304 may be further configured to store the updated sound models and/or anti-models in addition to the original sound models and/or anti-models so that the original sound models and/or anti-models are also separately available depending on the requirements of the applications.

The server 120 further includes a transmitting unit 310 configured to transmit sound models and/or anti-models via the network 180. The transmitting unit 310 may transmit sound models and/or anti-models to any of the sound data providers 140-1, . . . , 140-*m* or any of the devices 160-1, . . . , 160-*n*, which requests the sound models and/or anti-models.

Figure 5A:
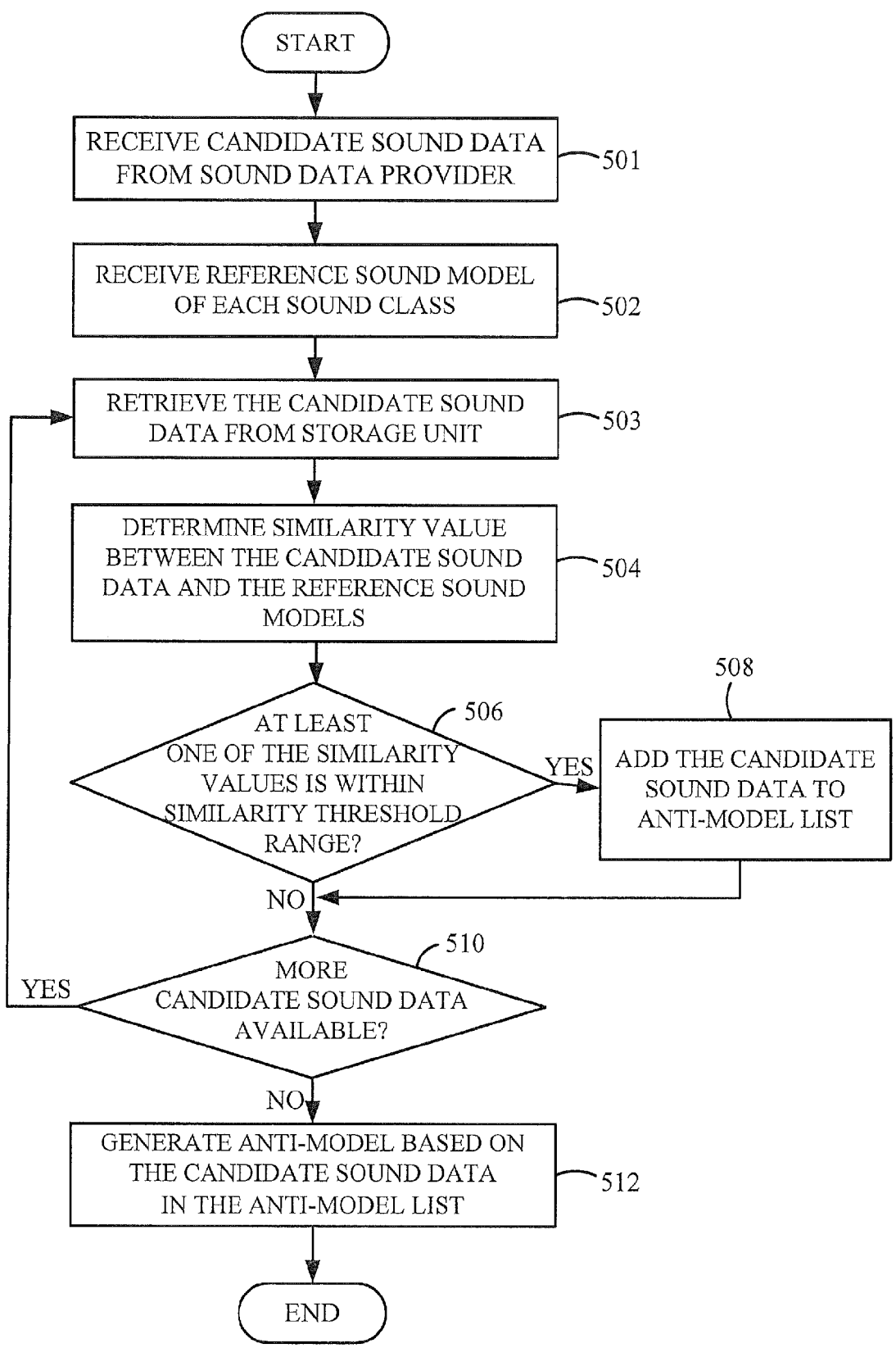
FIG. 5A is a flowchart of a method for generating an anti-model in accordance with one embodiment of the present disclosure.

FIG. 5A illustrates a flowchart of a method, performed by the server 120, for generating an anti-model Anti_M of one or more sound classes S1, . . . , Sn, in accordance with one embodiment of the present disclosure. The anti-model Anti_M may be indicative of sound classes other than but similar to the sound classes S1, . . . , Sn. At 501, the server 120 receives candidate sound data from one or more sound data providers 140-1, . . . , 140-*m* through the receiving unit 302. As used herein, "candidate sound data" refers to sound data received from any of the sound data providers 140-1, . . . , 140-*m*, for use in generating a sound model or an anti-model. The received candidate sound data may be stored in the storage unit 304. At 502, the anti-model generation unit 308 of the server 120 receives a reference sound model SM(S1), . . . , SM(Sn) of each sound class S1, . . . , Sn. As used herein, a "reference sound model" refers to a sound model selected for comparison with candidate sound data for generating an anti-model, which will be described in detail below. The reference sound models SM(S1), . . . , SM(Sn) may be received through the receiving unit 302 from any of the sound data providers 140-1, . . . , 140-*m* or generated by the sound model generation unit 306 of the server 120.

At 503, the anti-model generation unit 308 retrieves candidate sound data from the storage unit 304, which is available for comparison with the reference sound models. Specifically, the candidate sound data includes a candidate sound model, or a candidate sound database, which is selected from the sound data stored in the storage unit 304. In some embodiments, the candidate sound data may be selected from a limited scope of the sound data stored in the storage unit 304. For example, the scope may be limited to sound data having sound tags included in a particular level group of sound tags, which may be included in a sound tag table stored in the storage unit 304. Alternatively, all sound data stored in the storage unit 304 may be selected as the candidate sound data. In some embodiments, the scope may be limited according to an accessibility indication associated with the sound data stored in the storage unit 304. For example, if the accessibility indication indicates that the sound data is not accessible by sound data providers other than the originating sound data provider, the associated sound data may not be provided for generation of an anti-model for the other sound data providers.

At 504, the anti-model generation unit 308 determines a similarity value between the retrieved candidate sound data and each of the reference sound models SM(S1), ..., SM(Sn). At 506, the anti-model generation unit 308 determines whether at least one of the determined similarity values between the retrieved candidate sound data and the reference sound models SM(S1), ..., SM(Sn) is within a similarity threshold range. The similarity threshold range may be set to filter out any candidate sound data which is not "similar" to the reference sound models SM(S1), ..., SM(Sn). If it is determined that at least one of the determined similarity values is within the similarity threshold range, the candidate sound data is added to an anti-model list, at 508, which may be used to generate an anti-model.

At 510, it is determined whether there is any other candidate sound data from the storage unit 304 available for comparison with the reference sound models SM(S1), ..., SM(Sn). If it is determined that more candidate sound data is available, the anti-model generation unit 308 retrieves a next candidate sound data, at 503, and determines a similarity value between the next candidate sound data and each of the reference sound models SM(S1), ..., SM(Sn), at 504. On the other hand, if it is determined that no more candidate sound data is available, an anti-model is generated based on the candidate sound data in the anti-model list, at 512.

As described above, in one embodiment, candidate sound databases may be employed as the candidate sound data for generating the anti-model Anti_M. In this embodiment, a candidate sound database SD(x) is retrieved from the storage unit 304 at 503, and the similarity value is determined based on a likelihood of the candidate sound database SD(x) matching each of the reference sound models SM(S1), ..., SM(Sn) at 504. The likelihoods may be determined by calculating probabilities P(SD(x)|SM(S1)), ..., P(SD(x)|SM(Sn)) of the sound database SD(x) given the respective reference sound models SM(S1), ..., SM(Sn). For example, if GMM is used for modeling the reference sound models SM(S1), ..., SM(Sn), the probabilities P(SD(x)|SM(S1)), ..., P(SD(x)|SM(Sn)) may be calculated using the following equations.

$$P(SD(x)/SM(Sj)) = \sum_{i=1}^{M} \omega_i \times g(SD(x)/\mu_i \Sigma_i) \quad [1]$$

$$g(SD(x)/\mu_i \Sigma_i) = \frac{1}{(2\pi)^{\frac{D}{2}} \cdot |\Sigma_i|^{\frac{D}{2}}} e^{\{-\frac{1}{2}(SD(x)-\mu_i)^T \Sigma_i^{-1}(SD(x)-\mu_i)\}} \quad [2]$$

where SM(Sj) refers to the j-th reference sound model out of the reference sound models SM(S1), ..., SM(Sn), and $\mu_i$ and $\Sigma_i$ are a mean vector and a covariance matrix of the i-th Gaussian component of the GMM for each reference sound model SM(Sj). $\omega_i$ is a weight of the i-th Gaussian component, and M is the number of Gaussian PDF (Probability Density Functions) combined in the GMM. The mean vector $\mu_i$, the covariance matrix $\Sigma_i$, and the weight $\omega_i$ may be estimated using a conventional EM (Expectation Maximization) algorithm. Further, D is indicative of the number of dimensions of a vector indicating the candidate sound database SD(x).

In this embodiment, at 506, it is determined whether at least one of the likelihoods that the candidate sound database SD(x) corresponds to the reference sound models SM(S1), ..., SM(Sn) is within a similarity threshold range. The similarity threshold range has an upper limit, which may be set to a likelihood value to filter out any candidate sound database SD(x) having a likelihood that it is substantially the same as at least one of the reference sound models SM(S1), ..., SM(Sn). Further, the similarity threshold range has a lower limit, which may be set to a likelihood value to further filter out any candidate sound database SD(x) having a likelihood that it is far distant from the reference sound models SM(S1), ..., SM(Sn). Specific values of the upper and lower limits may be determined according to desired sensitivity and specificity levels of the sound detection.

In another embodiment, candidate sound models may be employed as the candidate sound data for generating the anti-model Anti_M. In this embodiment, at 504, the similarity value between the candidate sound data and each of the reference sound models SM(S1), ..., SM(Sn) is determined based on a distance between a candidate sound model SM(x) and each of the reference sound models SM(S1), ..., SM(Sn). For example, the anti-model generation unit 308 may measure the distance by calculating a KL (Kullback-Leibler) divergence. The KL divergence $D_{KL}(P||Q)$ which indicates the difference between a probability density P of each of the reference sound models SM(S1), ..., SM(Sn) and a probability density Q of the candidate sound model SM(x) may be calculated as follows:

$$D_{KL}(P // Q) = \int_{-\infty}^{\infty} P(x) \log \frac{P(x)}{Q(x)} dx \quad [3]$$

It should be noted that the KL-divergence is presented herein by way of an example of measuring the distance between the sound models, and any other methods of measuring the distance may be employed for this purpose.

In this embodiment, at 506, the anti-model generation unit 308 may determine whether at least one of the distances between the candidate sound model SM(x) and the reference sound models SM(S1), ..., SM(Sn) is within a similarity threshold range. The similarity threshold range may have a lower limit to filter out any candidate sound model SM(x) that is substantially identical to at least one of the reference sound models SM(S1), ..., SM(Sn). Further, the similarity threshold range may have an upper limit to filter out any candidate sound model SM(x) that is far distant from at least one of the reference sound models SM(S1), ..., SM(Sn). Specific values of the upper and lower limits may be determined according to desired sensitivity and specificity levels of the sound detection.

Figure 5B:
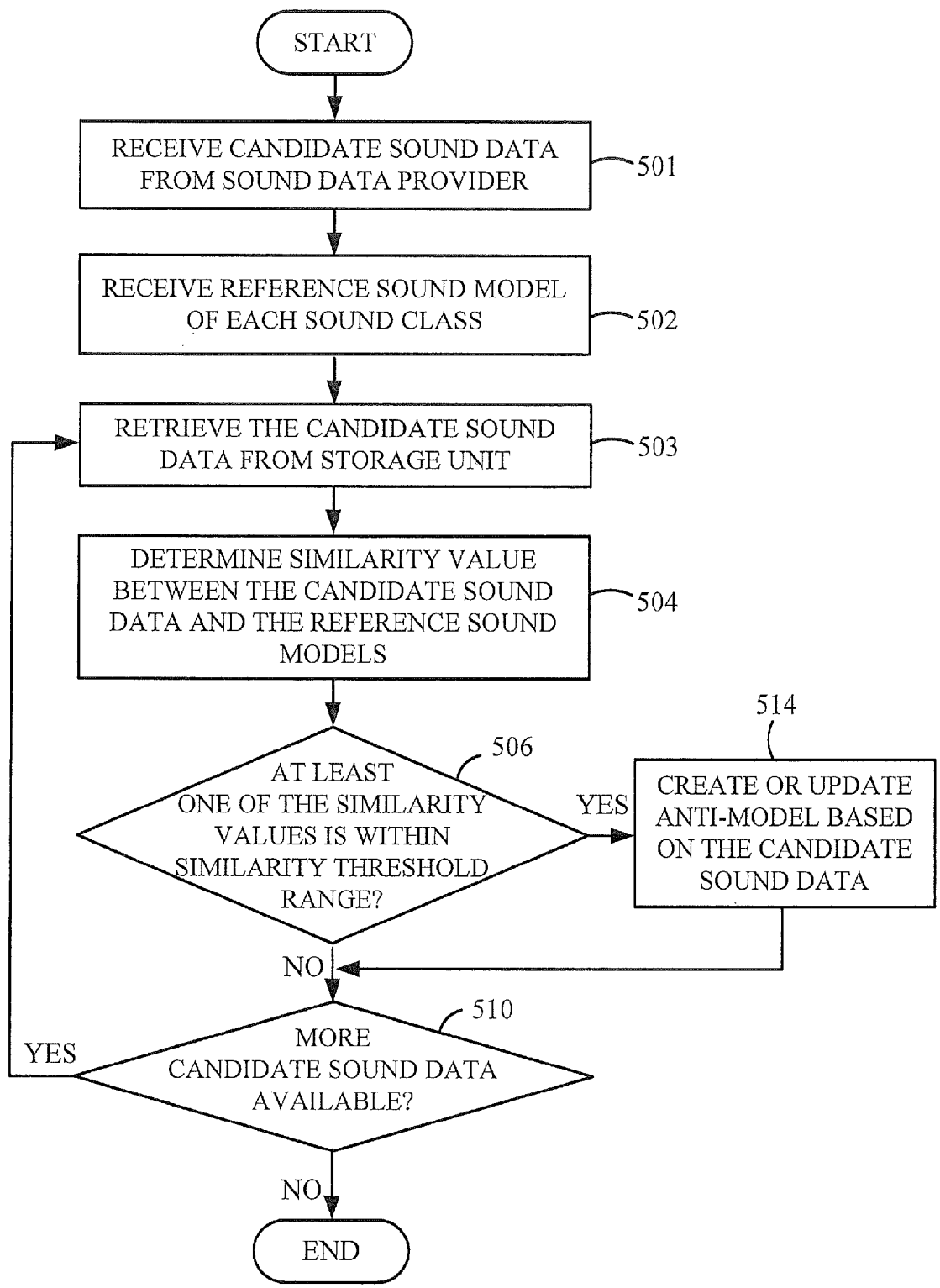
FIG. 5B is a flowchart of a method for generating an anti-model in accordance with another embodiment of the present disclosure.

FIG. 5B illustrates a flowchart of a method, performed by the server 120, for generating an anti-model Anti_M of one or more sound classes S1, ..., Sn, in accordance with another embodiment. In this embodiment, the server 120 performs operations 501 to 506 in the same manner as described above with reference to FIG. 5A. If it is determined that at least one of the similarities is within the threshold range at 506, an anti-model is created based on the candidate sound data, at 514. If the anti-model has been created previously, the anti-model may be updated based on the candidate sound data, at 558.

At 510, it is determined whether there is any other candidate sound data from the storage unit 304 available for reference with the reference sound models SM(S1), ..., SM(Sn). If it is determined that more candidate sound data is available, at 510, the anti-model generation unit 308 retrieves a next candidate sound data, at 503, and determines a similarity between the next candidate sound data and each of the reference sound models SM(S1), ..., SM(Sn), at 504. On the other hand, if it is determined that no more candidate sound data is available, the method terminates.

Figure 6:
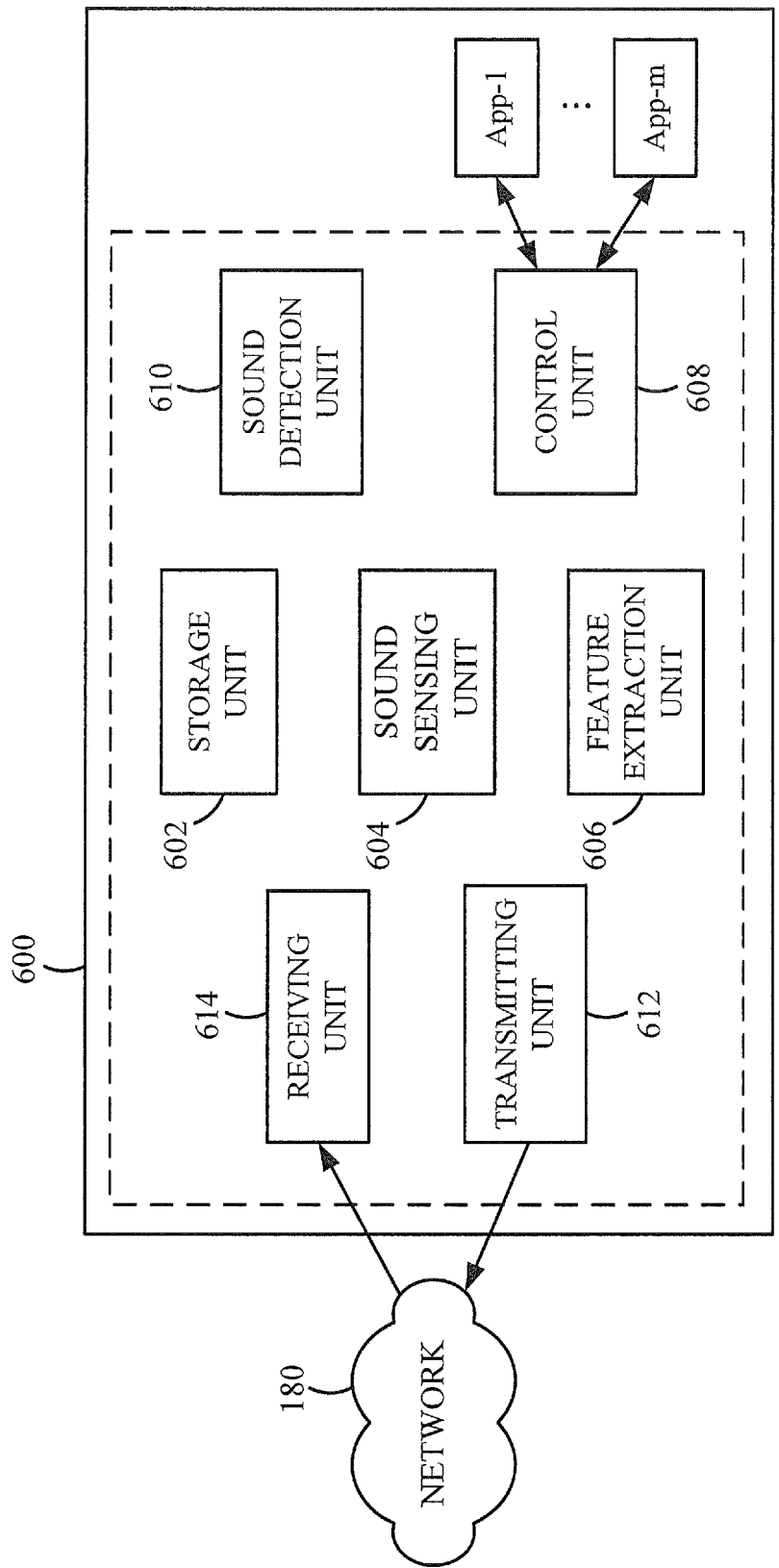
FIG. 6 illustrates a configuration of a device included in the sound recognition system described in FIG. 1 in accordance with one embodiment of the present disclosure.

FIG. 6 illustrates a configuration of a device 600 which provides a sound recognition service to a plurality of sound recognition applications running on the device in accordance with one embodiment of the present disclosure. Any of the devices 160-1, ..., 160-n may include a similar configuration to the device 600. The device 600 includes a storage unit 602 configured to store sound models and/or anti-models to be used for sound detection. Some of the sound models and/or the anti-models may be pre-stored in the storage unit 602 along with or prior to installing the applications in the device 600. Alternatively or additionally, some of the sound models and/or the anti-models may be received from an external system, such as the server 120 upon request by the applications.

A sound model and/or anti-model of a particular sound class stored in the storage unit 602 may be updated with latest versions of the respective models of the same sound class, which may be obtained from the server 120 through the network 180. In some embodiments, if the sound model and/or the anti-model is pre-stored along with installing an associated application in the device 600, the application may preset whether the sound model and/or the anti-model is updatable based on new versions of the respective models, as required.

Further, the device 600 further includes a sound sensing unit 604 configured to capture an input sound, such as the user's voice or environmental sound. The sound sensing unit 604 may include, for example, one or more microphones or any other type of sound sensors used to measure, record, or otherwise convey any aspect of the input sound of the device 600. Such sound sensing unit 604 may use software and/or hardware of the device 600 that may not be necessary for typical operation of the device 600. On the other hand, this embodiment may take advantage of sensors already used in daily operation of the device 600 such as, for example, microphones used to convey a user's voice during a telephone call in a mobile phone. Also, the sound sensing unit 604 may employ additional software and/or hardware to perform its functions in the device 600.

The device 600 includes a feature extraction unit 606 configured to extract a sound feature from the input sound. The feature extraction unit 606 may use any suitable signal processing scheme, including speech compression, enhancement, recognition, and synthesis methods to extract the sound feature of the input sound. For example, such signal processing scheme may employ MFCC, LPCC, PLP, and spectral entropy techniques, which are well-known methods for speech recognition or speech codec.

The device 600 further includes a control unit 608 configured to monitor the operation of any sound recognition application running on the device 600. The control unit 608 identifies any target sound classes that the sound recognition application is required to detect. In some embodiments, the control unit 608 detects any new application that initiates execution on the device 600. When detecting the new application, the control unit 608 also identifies any target sound classes of the new application. Further, while monitoring applications running on the device 600, if the control unit 608 detects that there is no application running on the device 600, the control unit 608 allows components of the device 600, related to the execution of the sound recognition application, to enter a sleep mode. For example, the control unit 608 controls the sound sensing unit 604 to suspend capturing an input sound during the sleep mode. Such monitoring operation may be conducted continuously or periodically by the control unit 608.

Further, the control unit 608 may retrieve the storage unit 602 to check whether sound models and/or anti-models, which are required to detect the target sound classes, are stored in the storage unit 602. The control unit 608 may instruct the storage unit 602 or a sound detection unit 610 (which will be described later) to transmit the required sound models and anti-models from the storage unit 602 to the sound detection unit 610. Also, the control unit 608 may check whether the storage unit 602 stores an anti-model of a combination of two or more target sound classes, which can be of benefit of decreasing computational power required in sound detection.

In some embodiments, the control unit 608 may request necessary sound models and/or anti-models to a system, such as the server 120. In particular, if the storage unit 602 does not store a required anti-model, the control unit 608 may try to obtain such anti-model from the server 120 when the network 180 with the server 120 is available. The control unit 608 may be further configured to monitor an availability of the network 180 with the system to send a request of a sound model and/or anti-model to the server 120. Further, the control unit 608 may request any updated version of the sound models and/or anti-models stored in the storage unit 602 from the server 120.

The control unit 608 is further configured to receive a sound detection result for an application from the sound detection unit 610 and transmit the sound detection result to the application. In some embodiments, the control unit 608 provides the sound detection result to an application if the sound detection result indicates that an input sound corresponds to a target sound class of the application. Further, the control unit 608 may provide the other applications with a message that target sound classes of those applications are not detected from the input sound.

The device 600 includes a transmitting unit 612 configured to transmit a request of a sound model and/or anti-model to the server 120 via the network 180. The device 600 also includes a receiving unit 614 configured to receive a sound model and/or anti-model from the server 120 via network. The received sound models and/or anti-model may be stored on the storage unit 602.

The sound detection unit 610 of the device 600 is configured to perform sound detection on the input sound. The sound detection unit 610 detects whether the input sound corresponds to any of the target sound classes, which are identified by the control unit 608, based on sound models and/or anti-models of the target sound classes. In some embodiments, the sound detection unit 610 determines whether a sound feature extracted from the input sound corresponds to any of the target sound classes. The sound detection unit 610 may use the sound models and the anti-models of the target sound classes as stored in the storage unit 602.

Figure 7A:
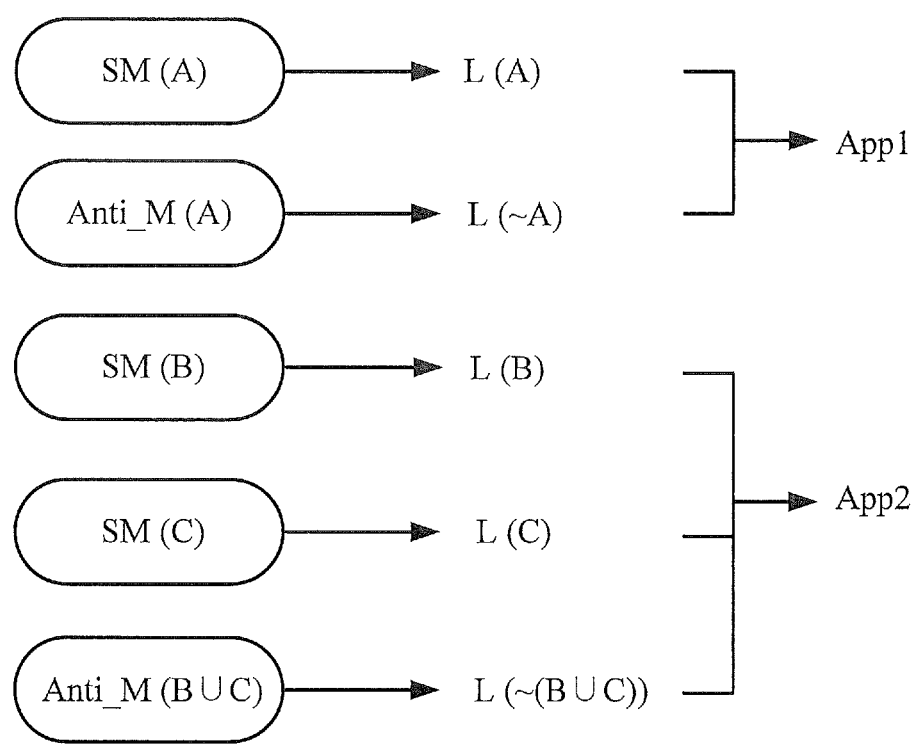
FIGS. 7A-7C illustrate exemplary scenarios of detecting sound classes.

For example, referring to FIG. 7A, if an application App1 needs to detect a target sound class A, the sound detection unit 610 is provided with a sound model SM(A) and an anti-model Anti_M(A) of the target sound class A. Based on the sound model SM(A), the sound detection unit 610 determines a likelihood L(A) that the input sound (or sound feature extracted from the input sound) corresponds to the target sound class A. Further, based on the anti-model Anti_M(A), the sound detection unit 610 further determines a likelihood L(~A) that the input sound corresponds to non-target sound classes other than but similar to the target sound class A. In some embodiments, the sound detection unit 610 generates a sound detection result indicating whether the target sound class A of the application App1 is detected from the input sound, based on the likelihood L(A) and the likelihood L(~A).

Further, as illustrated in FIG. 7A, if an application App2 needs to detect target sound classes B and C, the sound detection unit 610 is provided with sound models SM(B) and SM(C) of the target sound classes B and C, respectively, and an anti-model Anti_M(B∪C) of a combination of the target sound classes B and C. In this case, the sound detection unit 610 determines likelihoods L(B) and L(C), respectively, that the input sound corresponds to the target sound classes B and C, based on the sound models SM(B) and SM(C). Further, the sound detection unit 610 determines a likelihood L(~(B∪C)) that the input sound corresponds to non-target sound classes other than but similar to the target sound classes B and C based on the anti-model Anti_M(B∪C). In some embodiments, the sound detection unit 610 generates a sound detection result indicating whether one of the target sound classes B and C of the application App2 is detected from the input sound, as well as which target sound class of the target sound classes B and C is detected, based on the likelihoods L(B) and L(C) and the likelihood L(~(B∪C)).

Although it is illustrated in FIG. 7A that the anti-model Anti_M(B∪C) is provided for the application App2, the two separate anti-models Anti_M(B) and Anti_M(C) may be provided for the application App2 so that the two anti-models Anti_M(B) and Anti_M(C) may be used to independently determine respective likelihoods L(~B) and L(~C) that the input sound corresponds to sound classes other than the target sound classes B and C.

The sound detection unit 610 may calculate likelihoods in an effective way by reducing redundant calculation of the likelihoods for two or more applications, as follows. That is, if two or more applications have a target sound class in common, the sound detection unit 610 may calculate a likelihood that the input sound corresponds to the target sound class, and use the calculated likelihood for generating sound detection results for the two or more applications. Thus, redundant calculation of the likelihood related to the target sound class for the two or more applications can be avoided.

Figure 7B:
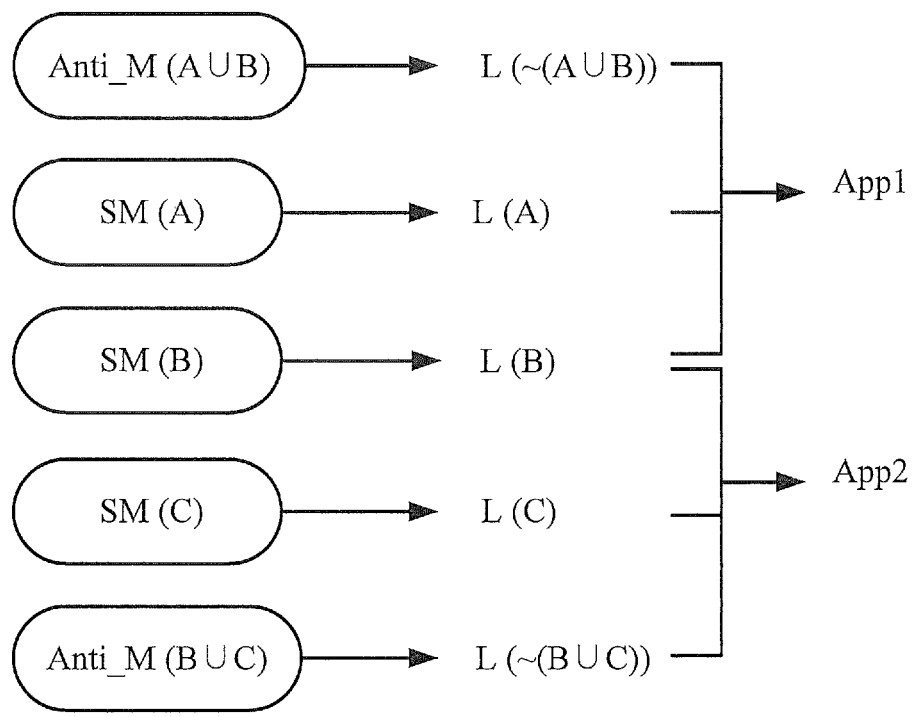

For example, referring to FIG. 7B, the application App1 is required to detect target sound classes A and B, and the application App2 is required to detect target sound classes B and C, and thus the applications App1 and App2 have the target sound class B in common. If the both applications App1 and App2 are running in the device 600 simultaneously, the sound detection unit 610 is provided with the sound models SM(A), SM(B) and SM(C) for sound detection for the both applications App1 and App2. The sound detection unit 610 then determines likelihoods L(A), L(B) and L(C) that the input sound corresponds to the target sound classes A, B and C, respectively, based on the sound models SM(A), SM(B) and SM(C). Further, the sound detection unit 610 determines likelihoods L(~(A∪B)) and L(~(B∪C)) that the input sound corresponds to non-target sound classes other than the target sound classes A and B and non-target sound classes other than the target sound classes B and C, respectively, based on the anti-models Anti_M(A∪B) and Anti_M(B∪C). The sound detection unit 610 generates a sound detection result for the application App1 based on the likelihoods L(A) and L(B) and the likelihood L(~(A∪B)), while generating a sound detection result for the application App2 based on the likelihoods L(B) and L(C) and the likelihood L(~(B∪C)). Thus, in this example, the likelihood L(B) is calculated once by the sound detection unit 610, and used in sound detection for the both applications App1 and App2. In this manner, computational costs can be reduced compared to when two or more applications individually calculate likelihoods related to a target sound class commonly shared by the applications.

In some embodiments, the sound detection unit 610 may use an anti-model to be shared for sound detection by two or more applications. For example, referring to FIG. 7C, if an application App1 having a target sound class A and an application App2 having target sound classes B and C are executed simultaneously on the device 600, the sound detection unit 610 may use an anti-model Anti_M(A∪B∪C) that is indicative of sound classes similar to the target sound class A of the application App1 as well as the target sound classes B and C of the application App2. For performing sound detection on an input sound, the sound detection unit 610 determines likelihoods L(A), L(B) and L(C) that the input sound corresponds to the respective target sound classes A, B and C, based on the sound models SM(A), SM(B) and SM(C). Further, The sound detection unit 610 determines a likelihood L(~(A∪B∪C)) that the input sound does not correspond to any of the target sound classes A, B and C, based on the anti-model Anti_M (A∪B∪C). The likelihood L(~(A∪B∪C)) calculated based on the anti-model Anti_M(A∪B∪C) can be used for generating sound detection results for both applications App1 and App2.

In some embodiments, in calculating a likelihood related to a target sound class of an application, the sound detection unit 610 may determine the likelihood based on a conditional probability of a sound model of the target sound given an input sound or a sound feature extracted from the input sound. A likelihood that an input sound corresponds to a target sound class TS may be indicated by the following conditional probability P(TS) of a sound model SM(TS) of the target sound class TS given a sound feature O of the input sound.

$$P(TS)=P(SM(TS)/O) \quad [4]$$

According to Bayes' theorem, the probability P(TS) in Equation [4] may be converted to a conditional probability P(O|SM(TS)) of the sound feature O given the sound model SM(TS), as follows:

$$P(O/SM(TS)) = \frac{P(SM(TS)/O)P(O)}{P(SM(TS))} \quad [5]$$

Thus, the sound detection unit 610 may determine the likelihood of the input sound corresponding to the target sound class TS to be the probability P(O|SM(TS)) of the sound feature O given the sound model SM(TS). As discussed above with reference to Equations [1] and [2], if GMM is used for modeling the sound models and the anti-models, the probability P(O|SM(TS)) may be calculated as follows:

$$P(O/SM(TS)) = \sum_{i=1}^{M} \omega_i \times g(O/\mu_i \Sigma_i) \quad [6]$$

$$g(O/\mu_i \Sigma_i) = \frac{1}{(2\pi)^{\frac{D}{2}} \cdot |\Sigma_i|^{\frac{D}{2}}} e^{\{-\frac{1}{2}(O-\mu_i)^T \Sigma_i^{-1}(O-\mu_i)\}} \quad [7]$$

where $\mu_i$ and $\Sigma_i$ are the mean vector and the covariance matrix of i-th Gaussian component of GMM, respectively, for the sound model SM(TS). $\omega_i$ is a weight of the i-th Gaussian component, and M is the number of Gaussian PDF combined in GMM. The mean vector $\mu_i$, the covariance matrix $\Sigma_i$, and the weight $\omega_i$ may be estimated by the conventional EM algorithm. In Equation [7], D indicates the number of dimensions of the sound feature O. A set of the mean vector $\mu_i$ and the covariance matrix $\Sigma_i$ may be specifically estimated for each sound model and anti-model. In some embodiments, HMM may be used for modeling the sound models and the anti-models. In this case, the mean vector $\mu_i$, the covariance matrix $\Sigma_i$ and the weight co, may be estimated by the Baum-Welch algorithm.

For example, in the scenario as illustrated in FIG. 7A, in determining the likelihoods L(A), L(B) and L(C) of the input sound matching to the respective target sound classes A, B and C, the sound detection unit 610 may calculate probabilities P(O|SM(A)), P(O|SM(B)), and P(O|SM(C)) of the sound feature O given the sound models SM(A), SM(B) and SM(C), using Expressions [6] and [7]. Further, in determining the likelihoods L(~A) and likelihood L(~(B∪C)), the sound detection unit 610 may calculate probabilities P(O|Anti_M(A)) and P(O|Anti_M(B∪C)) of the sound feature O given the anti-models Anti_M(A) and Anti_M(B∪C).

Figure 7C:
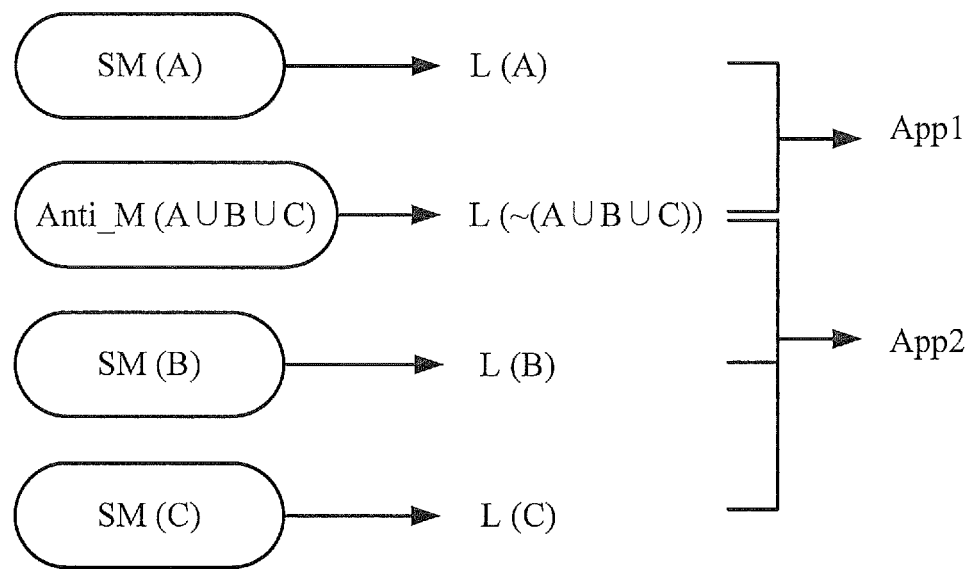

Further, referring to the example shown in FIG. 7C, in determining the likelihoods L(A), L(B) and L(C) that the input sound corresponds to the respective target sound classes A, B and C, the sound detection unit 610 may calculate the probabilities P(O|SM(A)), P(O|SM(B)), P(O|SM(C)) of the input sound given the sound models SM(A), SM(B) and SM(C) using Expressions [6] and [7]. Also, in determine the likelihood L(~(A∪B∪C)) that the input sound does not correspond to any of the target sound classes A, B and C, the sound detection unit 610 may calculate a probability P(O|Anti_M(A∪B∪C)) of the input sound given the anti-model Anti_M(A∪B∪C) in the manner as described above. According to the present embodiment, since the anti-model Anti_M(A∪B∪C) is commonly considered to detect the respective target sound classes of the applications App1 and App2, the computational cost may be reduced compared to considering different anti-models for each target sound class or each application.

Once the likelihoods are calculated based on the conditional probabilities in the manner as described above, the sound detection unit 610 may generate a sound detection result indicating whether the input sound corresponds to the target sound class TS of the application. To generate the sound detection result, the sound detection unit 610 may determine if a ratio of the likelihood P(SM(TS)|O) that the input sound corresponds to the target sound class to the likelihood P(Anti_M(TS)|O) that the input sound corresponds to the non-target sound classes satisfies a predetermined threshold α, as follows:

$$\frac{P(SM(TS)/O)}{P(Anti\_M(TS)/O)} > \alpha \quad [8]$$

The threshold α may be adjusted according to the sensitivity and the specificity of sound detection by the sound detection unit 610. Expression [8] may be converted to the following expression according to Bayes' theorem:

$$\frac{P(O/SM(TS))}{P(O/Anti\_M(TS))} > \alpha \cdot \frac{P(Anti\_M(TS))}{P(SM(TS))} \quad [9]$$

where P(SM(TS)) is a prior probability of the target sound class TS and P(Anti_M(TS)) is a prior probability of the non-target sound classes. The prior probabilities P(SM(TS)) and P(Anti_M(TS)) may be predetermined based on the occurrences of the target sound class and the non-target sound classes, respectively. If the probabilities P(O|SM(TS)) and P(O|Anti_M(TS)) computed through Expressions [6] and [7] satisfy Expression [9], the sound detection result indicates that the input sound corresponds to the target sound class TS. On the other hand, if the probabilities P(O|SM(TS)) and P(O|Anti_M(TS)) do not satisfy Expression [9], the sound detection result indicates that the input sound corresponds to non-target sound classes other than the target sound class TS. In some embodiments, the sound detection result includes at least one of the likelihood that the input sound corresponds to the target sound class and the likelihood that the input sound corresponds to the non-target sound classes. In the exemplary embodiment illustrated in FIG. 7A, a sound detection result indicating whether the input sound corresponds to the target sound class A may be generated for the application App1 by applying the probabilities P(O|SM(A)) and P(O|Anti_M(A)) to Expression [9]. In some embodiments, in generating a sound detection result based on Equation [9], the sound detection unit 610 may calculate a probability related to target sound classes once and commonly apply the calculated probability to Equation [9] to provide the sound detection result to more than one application. For example, with reference to FIG. 7C, the sound detection unit 610 may calculate the probability P(O|Anti_M(A∪B∪C)) of the input sound given the anti-model Anti_M(A∪B∪C) to generate a sound detection result for each applications App1 and App2. Specifically, the sound detection result for the application App1 is determined by applying the probability P(O|SM(A)) of the input sound given the sound model SM(A) and the probability P(O|Anti_M(A∪B∪C)) of the input sound given the anti-model Anti_M(A∪B∪C) to Equation [9]. Further, the sound detection result for the application App2 is determined by applying at least one of the probabilities P(O|SM(B)) and P(O|SM(C)) to Expression [9] along the probability P(O|Anti_M(A∪B∪C)). In this manner, the probability P(O|Anti_M(A∪B∪C)) is calculated once and used for generating sound detection results for the both applications App1 and App2.

In some embodiments, if an application has a plurality of target sound classes to detect, the sound detection unit 610 may select a "primary" target sound class from the plurality of target sound classes for purpose of reducing computational costs in sound detection. Specifically, based on the probabilities of the input sound given sound models of all target sound classes of the application, the sound detection unit 610 selects a target sound class associated with the highest probability as a primary target sound class. In this case, the sound detection unit 610 determines that the input sound does not correspond to the other target sound classes than the selected primary target sound class, without calculating the ratio according to Equation [9]. In addition, the sound detection unit 610 determines if the input sound corresponds to the primary target sound class based on the probabilities of the input sound given the sound model and anti-model of the primary target sound class. For example, if the probabilities related to the primary target sound class do not satisfy Expression [9], the sound detection unit 610 determines that that the input sound does not correspond to any of the target sound classes. In this manner, if the sound detection unit 610 generates a sound detection result based on Expression [9] with respect to the primary target sound class, the sound detection unit 610 can provide the sound detection result without needing to consider Expression [9] for the other target sound classes.

Again referring to the example shown in FIG. 7A, to provide a sound detection result for the application App2, the sound detection unit 610 may select a primary target sound class from the target sound classes B and C, which is associated with the highest probability out of the probabilities P(O|SM(B)) and P(O|SM(C)). The sound detection unit 610 then applies the higher probability out of the probabilities P(O|SM(B)) and P(O|SM(C)) to Expression [9] along with the probability P(O|Anti_M(B∪C)) to determine whether the input sound corresponds to the selected primary target sound class. If Expression [9] is satisfied, the sound detection unit 610 generates a sound detection result indicating that the input sound corresponds to the selected primary target sound class. Otherwise, if Expression [9] is not satisfied, the sound detection unit 610 generates a sound detection result indicating that the input sound does not correspond to any of the target sound classes B and C.

Figure 8:
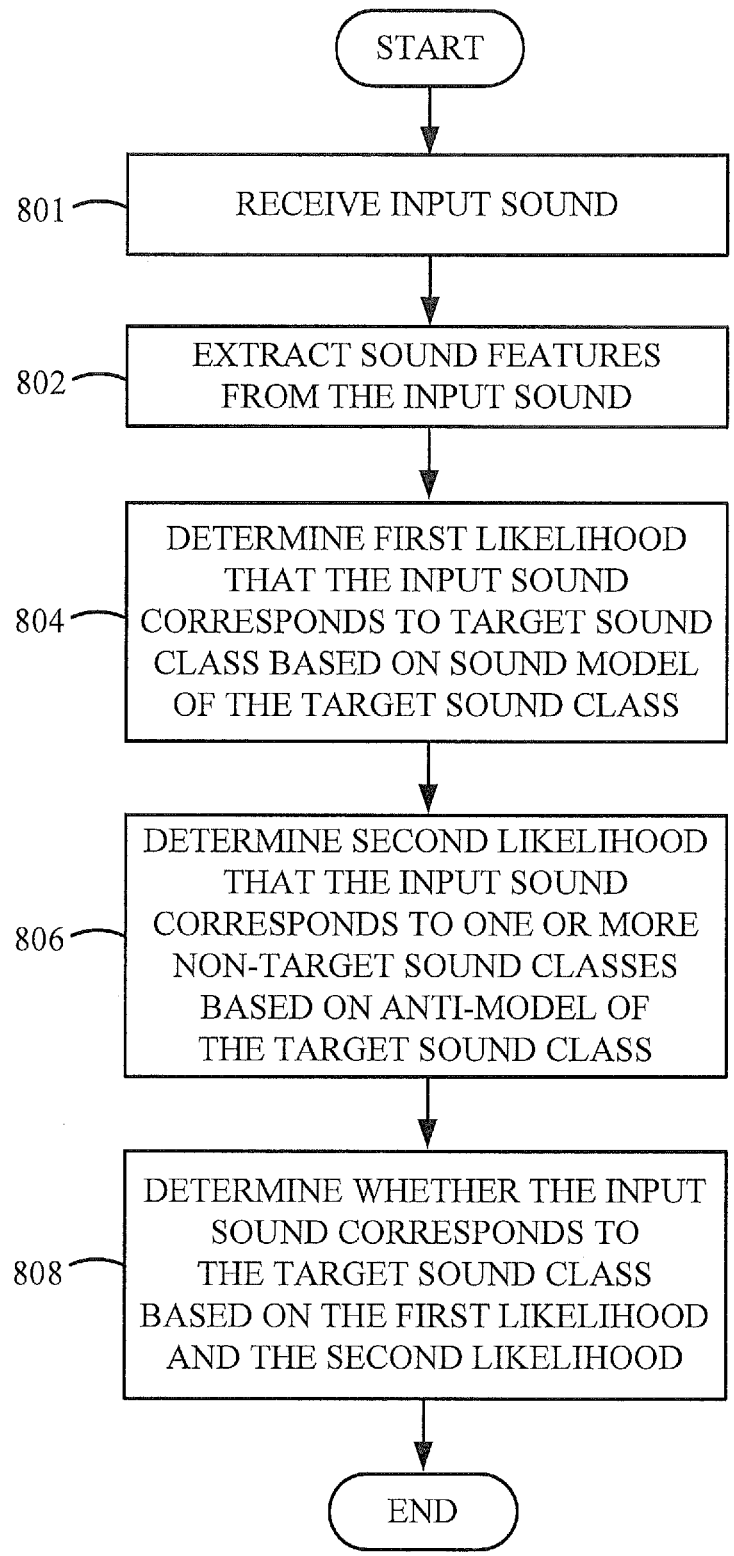
FIG. 8 is a flowchart of a method for providing a sound recognition service in accordance with one embodiment of the present disclosure.

FIG. 8 illustrates a method, performed by the device 600, for determining and providing a sound detection result for a sound recognition application according to one embodiment of the present disclosure. At 801, the device 600 captures an input sound through the sound sensing unit 604. At 802, the feature extraction unit 606 of the device 600 extracts a sound feature from the input sound. At 804, the sound detection unit 610 of the device 600 determines a first likelihood that the input sound corresponds to a target sound class of the sound recognition application, based on a sound model of the target sound class. In some embodiments, the sound detection unit 610 may determine the first likelihood by calculating a conditional probability of the sound feature given the sound model of the target sound class in the manner as describe above with reference to Equations [6] and [7]. For example, when only the application App2 is running on the device 600 in the scenario as shown in FIG. 7A, the first likelihoods L(B) and L(C) of the input sound matching the target sound classes B and C, respectively, are determined based on the respective sound models SM(B) and SM(C).

At 806, the sound detection unit 610 determines a second likelihood that the input sound corresponds to one or more non-target sound classes, based on an anti-model of the target sound class. The sound detection unit 610 may calculate a conditional probability of the sound feature given the anti-model of the target sound class to determine the second likelihood. For example, when only the application App2 is running on the device 600 in the scenario as shown in FIG. 7A, the second likelihood L(~(B∪C)) of the input sound matching non-target sound classes similar to the target sound classes B and C is determined based on the anti-model Anti_M(B∪C), respectively.

At 808, the sound detection unit 610 generates a sound detection result indicating whether the input sound corresponds to the target sound class, based on the respective first and second likelihoods. For example, referring to FIG. 7A, the sound detection unit 610 selects a primary target sound class among the target sound classes B and C based on the first likelihoods L(B) and L(C). If the target sound classes B is selected as the primary target sound class, the sound detection unit 610 then generates a sound detection result indicating whether the input sound corresponds to the primary target sound class B based on the first likelihood L(B) of the input sound matching the primary target sound class B and the second likelihood L(~(B∪C)). As described above, Expression [9] may be employed in determining the sound detection result based on the first likelihood and the second likelihood. In some embodiments, the control unit 608 of the device 600 may transmit the sound detection result to the application App2 when the sound detection result indicates that the input sound corresponds to the primary target sound class.

Figure 9:
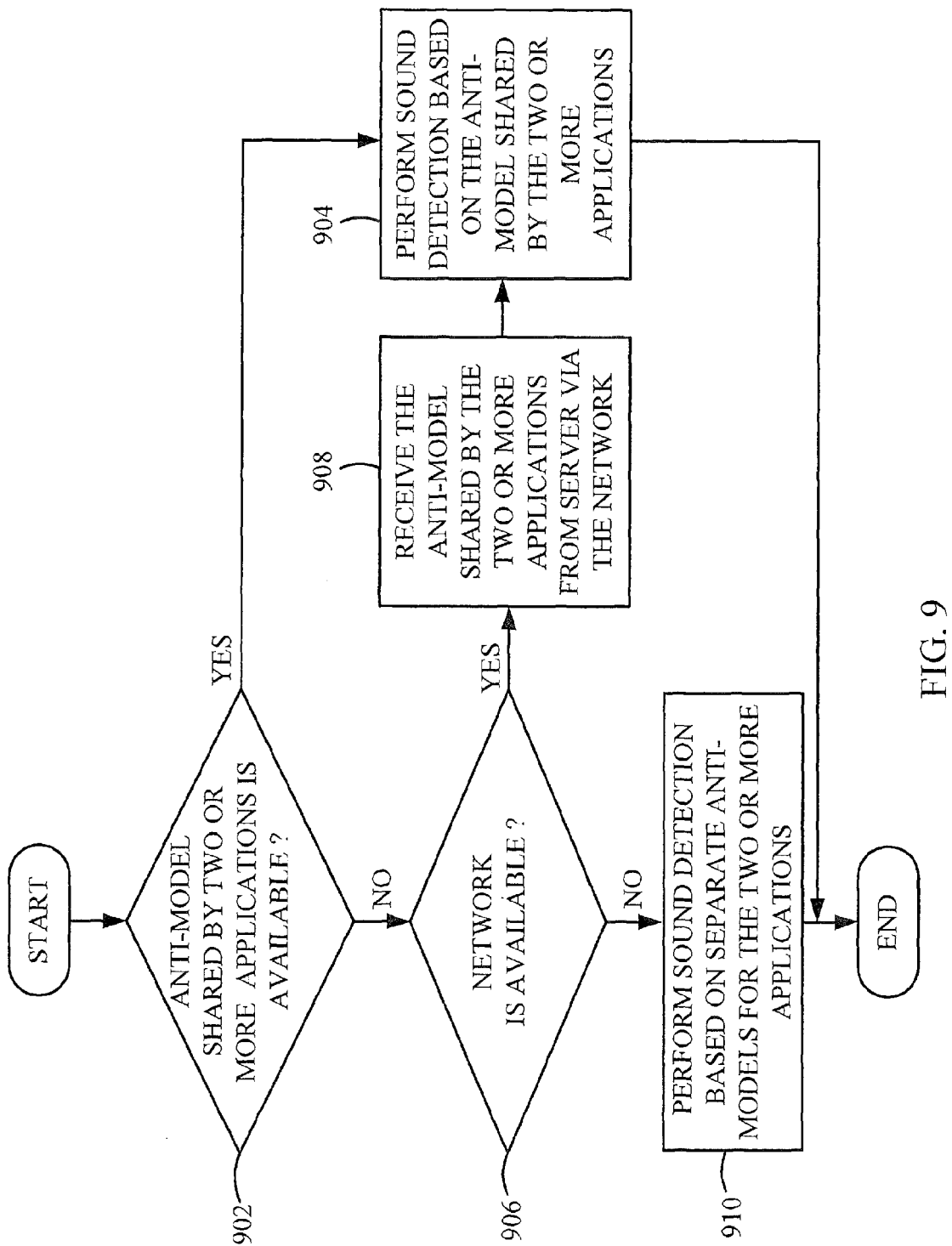
FIG. 9 is a flowchart of a method for providing a sound recognition service in accordance with another embodiment of the present disclosure.

FIG. 9 illustrates a method, performed by the device 600, for providing sound detection results to two or more sound recognition applications in accordance with one embodiment of the present disclosure. At 902, the control unit 608 of the device 600 checks whether the storage unit 602 stores an anti-model of a combination of target sound classes to be shared by two or more sound recognition applications running on the device 600. For example, the control unit 608 checks whether the storage unit 602 stores the anti-model Anti_M(A∪B∪C) to be shared by the two applications App1 and App2, referring to FIG. 7C.

If it is determined, at 902, that the storage unit 602 stores the anti-model to be shared by the applications, the sound detection unit 610 performs a sound detection based on the anti-model shared by the applications, at 904. In some embodiments, the control unit 608 may instruct the storage unit 602 to provide the sound detection unit 610 with the anti-model to be shared by the applications. For example, referring to FIG. 7C, the sound detection unit 610 generates a sound detection result by determining the second likelihood L(~(A∪B∪C)) based on the anti-model Anti_M(A∪B∪C), as well as the first likelihoods L(A), L(B) and L(C) based on the respective sound models SM(A), SM(B) and SM(C). If it is determined, at 902, that the storage unit 602 does not store the anti-model to be shared by the applications, the control unit 608 checks whether the network 180 between the server 120 and the device 600 is available, at 906.

If it is determined, at 906, that the network is available, the device 600 receives the anti-model to be shared by the applications through the receiving unit 614 from the server 120 via the network at 908, and then stores the received anti-model on the storage unit 602. In some embodiments, the control unit 608 may send a message to the server 120, requesting the anti-model of a combination of target sound classes of two or more applications, at 908. For example, referring to FIG. 7C, the control unit 608 may send a message requesting the anti-model Anti_M(A∪B∪C) of a combination of target sound classes A, B and C for applications App1 and App2. In response to the message sent from the device 600, the server 120 retrieves the requested anti-model which has been generated and pre-stored in the storage unit 304. Alternatively, the server 120 may generate the requested anti-model in response to the message from the device 600 and provide the generated anti-model to the device 600. After the received anti-model is stored in the storage unit 602, sound detection is performed based on such anti-model, at 904.

In the meantime, if it is determined at 906 that no network is available between the server 120 and the device 600, the sound detection unit 610 performs the sound detection based on separate anti-models of target sound classes for the two or more applications. In some embodiments, the control unit 608 may instruct the storage unit 602 to provide any available anti-models for the two or more applications, which are currently stored in the storage unit 602. For example, the anti-model Anti_M(A) and the anti-model Anti_M(B∪C) as illustrated in FIG. 7A are provided to the sound detection unit 610. Thus, as described above with reference to FIG. 7A, the second likelihood L(~A) and the second likelihood L(~(B∪C)) are determined based on the anti-model Anti_M(A) and the anti-model Anti_M(B∪C), respectively. Further, similarly to the operation at 904, the first likelihoods L(A), L(B) and L(C) are determined based on the respective sound models SM(A), SM(B) and SM(C). At 910, the sound detection unit 610 generates a sound detection result for each of the two or more applications based on the calculated first and second likelihoods.

In some embodiments, after or in the course of performing the sound detection based on separately available anti-models of target sound classes at 910, the control unit 608 may check whether the network is available, at 906. Thus, if the control unit 608 detects that the network is available and an anti-model of a combination of the target classes is received from the server 120, the current sound detection mode may be switched at 910 to the sound detection mode as performed in the operation at 904, so that the received anti-model of a combination of the target classes may be used in sound detection.

Figure 10:
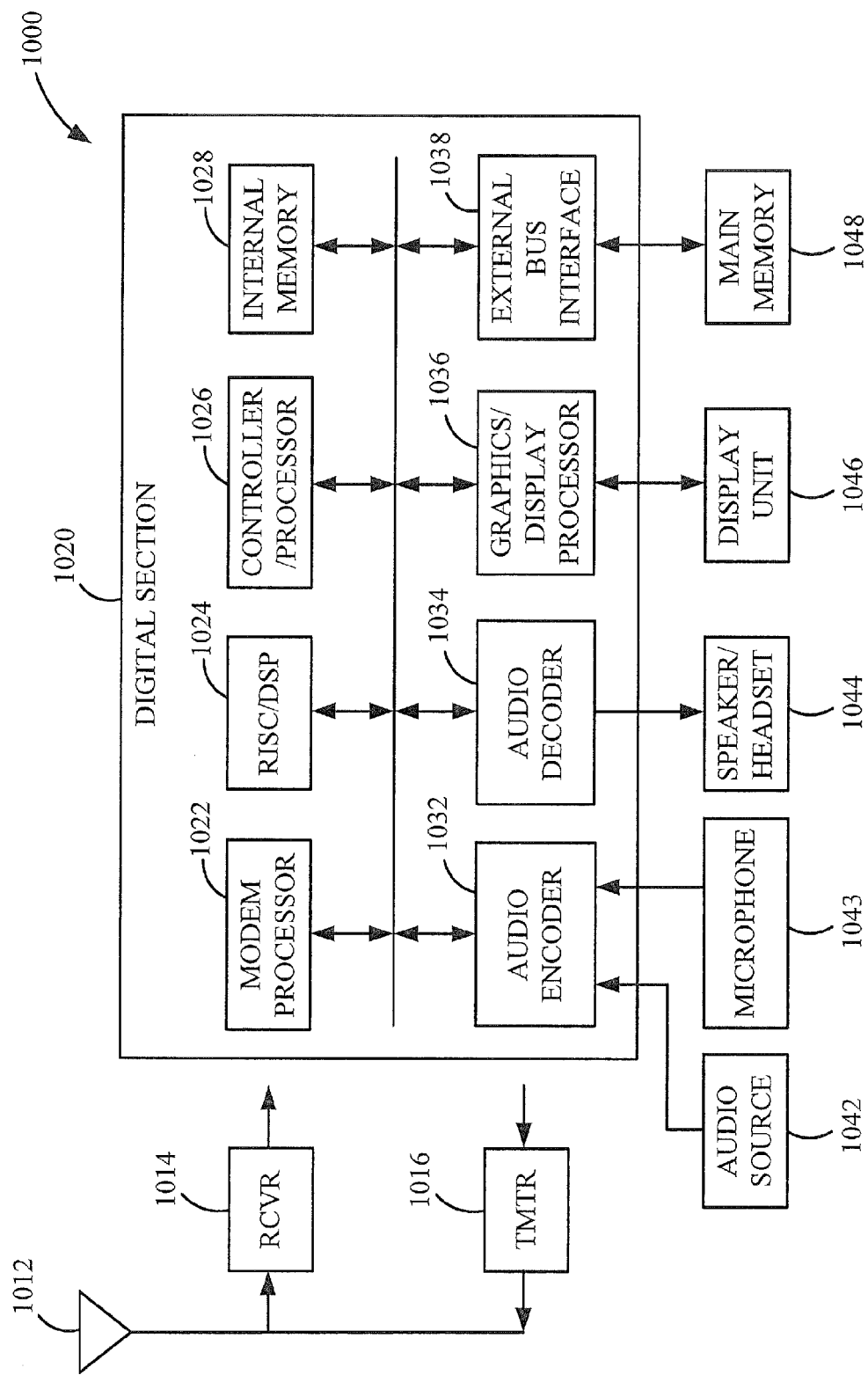
FIG. 10 is a block diagram of an exemplary mobile device in a wireless communication system.

FIG. 10 shows a block diagram of a design of an exemplary mobile device 1000 (which may be used as the device 600 as shown in FIG. 6) in a wireless communication system. The mobile device 1000 may be a cellular phone, a terminal, a handset, a personal digital assistant (PDA), a wireless modem, a cordless phone, etc. The wireless communication system may be a Code Division Multiple Access (CDMA) system, a Global System for Mobile Communications (GSM) system, a Wideband CDMA (W-CDMA) system, a Long Term Evolution (LTE) system, a LTE Advanced system, etc.

The mobile device 1000 is capable of providing bidirectional communication via a receive path and a transmit path. On the receive path, signals transmitted by base stations are received by an antenna 1012 and are provided to a receiver (RCVR) 1014. The receiver 1014 conditions and digitizes the received signal and provides the conditioned and digitized signal to a digital section 1020 for further processing. On the transmit path, a transmitter (TMTR) 1016 receives data to be transmitted from the digital section 1020, processes and conditions the data, and generates a modulated signal, which is transmitted via the antenna 1012 to the base stations. The receiver 1014 and the transmitter 1016 may be part of a transceiver that may support CDMA, GSM, W-CDMA, LTE, LTE Advanced, etc.

The digital section 1020 includes various processing, interface, and memory units such as, for example, a modem processor 1022, a reduced instruction set computer/digital signal processor (RISC/DSP) 1024, a controller/processor 1026, an internal memory 1028, a generalized audio encoder 1032, a generalized audio decoder 1034, a graphics/display processor 1036, and an external bus interface (EBI) 1038. A modem processor 1022 may perform processing for data transmission and reception, e.g., encoding, modulation, demodulation, and decoding. The RISC/DSP 1024 may perform general and specialized processing for the wireless device 1000. The controller/processor 1026 may control the operation of various processing and interface units within the digital section 1020. The internal memory 1028 may store data and/or instructions for various units within the digital section 1020.

The generalized audio encoder 1032 may perform encoding for input signals from an audio source 1042, a microphone 1043, etc. The generalized audio decoder 1034 may perform decoding for coded audio data and may provide output signals to a speaker/headset 1044. It should be noted that the generalized audio encoder 1032 and the generalized audio decoder 1034 are not necessarily required for interface with the audio source, the microphone 1043 and the speaker/headset 1044, and thus may be omitted in the mobile device 1000. The graphics/display processor 1036 may perform processing for graphics, videos, images, and text, which may be presented to a display unit 1046. The EBI 1038 may facilitate transfer of data between the digital section 1020 and a main memory 1048.

The digital section 1020 may be implemented with one or more processors, DSPs, microprocessors, RISCs, etc. The digital section 1020 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosure herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For a firmware and/or software implementation, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, or the like. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, DSL, or wireless technologies such as infrared, radio, and microwave are included in the definition of medium. Disk and disc, as used herein, includes CD, laser disc, optical disc, digital versatile disc (DVD), floppy disk and blu-ray disc where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   identifying, at a device, a first target sound class based on a first request from a first application executing at the device;
   identifying a second target sound class based on a second request from a second application executing at the device;
   receiving an input sound;
   determining a first likelihood of the input sound matching the first target sound class based on a sound model of the first target sound class;
   determining a second likelihood of the input sound matching at least one non-target sound class based on an anti-model;
   generating a first sound detection result for the first target sound class; and
   generating a second sound detection result for the second target sound class, wherein the first sound detection result indicates whether the input sound matches the first target sound class and the second sound detection result indicates whether the input sound matches the second target sound class, and wherein the first sound detection result is based on the first likelihood and the second likelihood.

2. The method of claim 1, further comprising providing the first sound detection result to the first application based on the first sound detection result indicating that the input sound corresponds to the first target sound class.

3. The method of claim 1, wherein the anti-model is indicative of a plurality of non-target sound classes including sound classes other than a union of the first target sound class and the second target sound class.

4. The method of claim 1, further comprising receiving the anti-model via a network from a server.

5. The method of claim 1, wherein the anti-model is indicative of a plurality of non-target sound classes including sound classes other than the first target sound class, wherein the second sound detection result is based on comparing the input sound to a second anti-model indicative of a second plurality of non-target sound classes including sound classes other than the second target sound class, and wherein the anti-model and the second anti-model are different.

6. The method of claim 1, wherein the first target sound class and the second target sound class are different, and wherein the second sound detection result is determined based on the first sound detection result and without comparing the input sound to the second target sound class.

7. The method of claim 6, wherein when the first sound detection result indicates that the input sound does not match the first target sound class, the second sound detection result indicates that the input sound does not match the second target sound class.

8. A device comprising:
   a microphone configured to capture an input sound; and
   a memory storing instructions that when executed by a processor cause the processor to:
   identify a first target sound class based on a first request from a first application;
   identify a second target sound class based on a second request from a second application;
   determine a first likelihood of the input sound matching the first target sound class based on a sound model of the first target sound class;
   determine a second likelihood of the input sound matching at least one non-target sound class based on an anti-model;
   generate a first sound detection result for the first target sound class; and
   generate a second sound detection result for the second target sound class, wherein the first sound detection result indicates whether the input sound matches the first target sound class and the second sound detection result indicates whether the input sound matches the second target sound class, and wherein the first sound detection result is based on the first likelihood and the second likelihood.

9. The device of claim 8, wherein the processor is further configured to extract at least one sound feature from the input sound.

10. The device of claim 8, wherein the processor is further configured to determine whether a ratio of the first likelihood to the second likelihood satisfies a threshold value.

11. The device of claim 8, wherein the processor is further configured to provide the first sound detection result to the first application, in response to the first request, when the first sound detection result indicates that the input sound corresponds to the first target sound class.

12. The device of claim 8, wherein the anti-model is based on the one or more target sound classes.

13. The device of claim 8, further comprising a receiver configured to receive the anti-model from a server.

14. A non-transitory computer-readable medium comprising instructions that, when executed by a processor, cause the processor to perform operations including:
   identifying a first target sound class based on a first request from a first application executing at a device;
   identifying a second target sound class based on a second request from a second application executing at the device;
   receiving an input sound;
   determining a first likelihood of the input sound matching the first target sound class based on a sound model of the first target sound class;
   determining a second likelihood of the input sound matching at least one non-target sound class based on an anti-model;
   generating a first sound detection result for the first target sound class; and
   generating a second sound detection result for the second target sound class, wherein the first sound detection result indicates whether the input sound matches the first target sound class and the second sound detection result indicates whether the input sound matches the second target sound class, and wherein the first sound detection result is based on the first likelihood and the second likelihood.

15. The non-transitory computer-readable medium of claim 14, wherein the operations further include receiving the anti-model via a network from a server.

16. The non-transitory computer-readable medium of claim 15, wherein, prior to receiving the anti-model, the operations further include:
   determining whether the anti-model is stored in a memory accessible to the processor; and
   requesting the anti-model via the network from the server based on a determination that the anti-model is not stored in the memory.

17. The non-transitory computer-readable medium of claim 15, wherein the one or more target sound classes includes multiple target sound classes, and wherein the anti-model is indicative of sound classes other than at least two target sound classes.

18. A device comprising:
   means for receiving an input sound;
   means for identifying a first target sound class based on a first request from a first application executing at a device and for identifying a second target sound class based on a second request from a second application executing at the device;
   means for determining a first likelihood of the input sound matching the first target sound class based on a sound model of the first target sound class;
   means for determining a second likelihood of the input sound matching at least one non-target sound class based on an anti-model; and
   means for generating a first sound detection result for the first target sound class and generating a second sound detection result for the second target sound class, wherein the first sound detection result indicates whether the input sound matches the first target sound class and the second sound detection result indicates whether the input sound matches the second target sound class, and wherein the first sound detection result is based on the first likelihood and the second likelihood.

19. The device of claim 18, wherein when the one or more target sound classes includes more than one target sound class, the anti-model is indicative of a plurality of non-target sound classes including sound classes other than at least one of the more than one target sound classes.

* * * * *